United States Patent [19]

Roque et al.

[11] Patent Number: 5,032,298
[45] Date of Patent: Jul. 16, 1991

[54] LOW-MOLECULAR WEIGHT ACRYLATE-ACRYLAMIDE COPOLYMERS, THEIR MANUFACTURE AND USE TO PREVENT DEPOSITION OF SALTS FROM AQUEOUS MEDIA

[75] Inventors: Claude Roque, Rueil Malmaison; Alain Ribba, Crotelle, both of France

[73] Assignees: Institut Francais du Petrole, Rueil Malmaison; Manufacture de Produits Chimiques Protex, Paris, both of France

[21] Appl. No.: 103,330

[22] Filed: Oct. 1, 1987

[30] Foreign Application Priority Data

Oct. 2, 1986 [FR] France ............................ 86 13862

[51] Int. Cl.⁵ .............................................. C09K 7/00
[52] U.S. Cl. .............................. 252/8.552; 252/8.555; 562/512.4
[58] Field of Search ............... 252/8.551, 8.552, 8.553, 252/8.554, 8.555; 562/512.14

[56] References Cited

U.S. PATENT DOCUMENTS 3,665,035 5/1972 Rice et al. .
3,756,257 9/1973 Rice et al. .
4,072,607 2/1978 Schiller et al. ................... 210/701
4,236,545 12/1980 Knight et al. ................. 252/8.551 X
4,359,483 11/1982 Kaetsu et al. ....................... 424/488
4,512,552 4/1985 Katayama et al. ................. 252/389
4,644,020 2/1987 Stahl ............................ 252/8.554 X Primary Examiner—Deborah L. Kyle
Assistant Examiner—Valerie Free
Attorney, Agent, or Firm—Millen, White & Zelano

[57] ABSTRACT

The invention concerns low molecular weight copolymers of acrylic acid or at least partially salified acrylic acid and acrylamide, their process of manufacture and their use. These copolymers may be used to prevent the formation of deposits on the walls of oil or geothermal equipment from aqueous systems containing dissolved salts. The copolymer is characterized in that it comprises recurrent units deriving from acrylic acid and acrylamide in a proportion by weight from 95:5 to 25:75. Furthermore, the distribution of the molecular weights of the copolymer, as determined by exclusion analytic chromatography, is such that at least 60% of the weight molecular weights are lower than 500.

19 Claims, 1 Drawing Sheet

LOW-MOLECULAR WEIGHT ACRYLATE-ACRYLAMIDE COPOLYMERS, THEIR MANUFACTURE AND USE TO PREVENT DEPOSITION OF SALTS FROM AQUEOUS MEDIA

The present invention concerns low molecular weight copolymers of acrylic acid or at least partially salified acrylic acid and acrylamine, their process of manufacture and their use to prevent the formation of deposits of on the walls of oil or geothermal equipment from aqueous systems containing dissolved salts.

More particularly, the invention relates to a process for inhibiting depositions resulting from incompatibilities of the injection and field waters and/or from their destabilization.

Nonlimitative applications of the invention are those relating to oil or geothermal industries, bottom and surface equipments used in the domain of wall injectivity and productivity and generally those using industrial aqueous systems.

BACKGROUND OF THE INVENTION

Generally, it is desirable in industrial operations to inhibit the formation of deposits. For example, one of the major difficulties posed by water injection in oil fields, i.e., the physicochemical incompatibility between the injected waters and the field waters, results in the formation of deposits, for example alkaline earth deposits, producing irreversible degradation particularly detrimental to the reservoir rock and to the bottom and the surface production equipment.

Many anionic polymers and copolymers have been used as agents for inhibiting inorganic deposits, as disclosed for example, in U.S. Pat. Nos. 4,072,607, 4,175,100; and 4,518,511. Generally, their weight distribution ranges from 500 to 25,000. Some of them may have a weight distribution in the range of from 3,000 to 300,000, which is controlled, as disclosed in U.S. Pat. No. 4,143,222.

For example, U.S. Pat. No. 4,072,607 discloses the preparation of a acrylate-acrylamide copolymer mixture in molar proportions from about 20:1 to 1:1 having a molecular weight ranging from 500 to 12,000, with a distribution that such at least 60% of said copolymer has a molecular weight of from 500 to 2,000, at least 10% a molecular weight of from 4,000 to 12,000 and the remainder has a molecular weight of from 2,000 to 4,000, these distributions being determined by exclusion chromatography.

This copolymer is prepared by polymerizing acrylamide monomer in the presence of an initiator and a chain transfer agent, the obtained polyacrylamide being partially hydrolyzed to sodium acrylate. With a chain transfer agent introduced during polymerization, first in a proportion of 3% and then in a proportion of 16% with respect to acrylamide, the above-mentioned weight distribution is observed.

Moreover, U.S. Pat. Nos. 3,665,035 and 3,756,257 disclose the use, as a crystallization prevention agent in the treatment of oil wells, of a polymer composition obtained by reacting at 24° C., in an inert solvent such as water, 80-90 parts by weight of acrylic acid, as single monomer, with 7-15 parts by weight of thioglycolic acid, as a chain transfer agent, and 1.5-5 parts by weight of ammonium persulfate, as a radical initiator. The acrylic acid obtained has an average molecular weight of from 500 to 1,000.

It is prepared by a process comprising one or more stages, with one or two additions to the inert medium formed by the acrylic acid polymer obtained at the end of the first stage, of a new charge of acrylic acid, chain transfer agent and radical initiator catalyst, which will polymerize and form an additional polymerization product and so on.

It has been discovered that this type of polymer is only partially adapted to the treatment of deposits formed of complex sulfates of alkaline-earth metals under severe thermodynamic conditions.

On the other hand, it has been discovered that copolymers of high molecular weight are difficult to solubize and hence difficult to use in the prevailing conditions of deep fields with highly salted water (e.g., 150-350 g/l salt content), high temperature and pressure (e.g., 120°-150° C., 100-400 bars) and had a lower inhibiting activity in the above-mentioned thermodynamic conditions. Moreover, it has been observed that the inhibition effect of these products was very short (a few hours) even under thermodynamic conditions of low severity.

It has also been discovered that these products of the prior art were not soluble to a substantial extent in water having a salt content of 30-100 g/l and, accordingly, that they were not useful when sea water, for example, is injected.

OBJECTS OF THE INVENTION

Accordingly, a first object of the invention is to provide a new copolymer composition of acrylic acid and-/or acrylate-acrylamide of very low molecular weight, useful for preventing precipitation and/or formation of crystalline deposits onto the surfaces in contact with incompatible water.

Another object is to provide a process for manufacturing such a copolymer composition.

Another object of the invention is to provide a process involving the use of products soluble in mixtures of salted waters (particularly having a salt content of 350 g/l or more) and whose activity level is high under the severe thermodynamic conditions prevailing in deep fields.

Another object is to provide a process for injecting inhibiting agents soluble in the salted water to be injected (e.g., sea-water and water from water-bearing strata).

Still another object is to provide a process for inhibiting the crystalline growth of the deposits, under the thermodynamic conditions of surface as well as those of the very deep reservoirs.

A further object is the use of an inhibitor solution whose properties are maintained over periods compatible with the length of the oil treatments during the production stage, as well as during, the treatment at the surface which may be performed on-site at a far distance from the production place.

SUMMARY OF THE INVENTION

The present invention overcomes the above-mentioned disadvantages and fulfills these objects. It concerns an anionic copolymer or copolymer composition comprising acrylic acid and acrylamide in respective proportions by weight ranging from 95:5 to 25:75, advantageously from 90:10 to 50:50.

More precisely, the distribution of the molecular weight of said copolymer, determined by exclusion analytic chromatography, is such that at least 60% of the weight molecular weights are lower than 500. Its polydispersity is at most 3 and advantageously at most 2.

The invention also concerns a copolymer composition or anionic copolymers comprising recurrent units derived from acrylic acid, at least partly as alkaline salts and acrylamide, the values of the ratio by weight, the distribution of molecular weights and the polydispersity being defined as above. The acrylate alkaline salts are advantageously sodium acrylate, potassium acrylate and ammonium acrylate, either alone or as a mixture.

A copolymer composition according to the invention is a mixture of copolymers, as defined above, having in the molecule such a number of recurrent units (for example, from 2 to 10) that the average molecular weight corresponds to the above definition according to the invention.

The invention also concerns a process for manufacturing a copolymer, characterized as the reaction product of the following four constituents:

a) a first monomer consisting essentially of acrylic acid, b) a second monomer consisting essentially of acrylamide, c) a chain transfer agent, and d) a free radical initiator catalyst.

The operation is advantageously conducted in a medium comprising an inert solvent, at a temperature from 60° to 120° C., preferably from 70° to 100° C. The total amount of said monomers in proportion by weight to said medium is from 4 to 15%. The chain transfer agent is used in an amount of 10-20% by weight and the catalyst in amount of 2-8% by weight in proportion to said monomers, the first and second monomers being in respective proportions by weight from 95:5 to 25:75, so as to obtain a product comprising a mixture of the desired copolymer with the solvent.

The reaction is exothermic and the exothermicity is controlled by cooling the reaction mixture. The reaction is performed in solution and any inert solvent or system of inert solvents adapted to solubilize the charge constituents or not to substantially react with the charge or the copolymer composition formed may be used. Water is particularly advantageous as a solvent for the sake of economy and convenience.

Preferably the proportion of monomers in the polymerization medium is low. This characteristic, together with exothermicity control, are favorable to the formation of a copolymer of low molecular weight.

According to one characteristic feature of the invention, the copolymerization reaction may be completed by adding to said solvent-copolymer product a further catalyst amount of 0.5-4% by weight in proportion to said monomers, the reaction being allowed to continue so that substantially all the monomers are used up.

According to another characteristic of the invention, the copolymerization may be conducted in several successive steps instead of a single step. Accordingly, the involved amount of constituents is divided into substantially equal aliquot parts, a first copolymerization reaction is performed under the above-define conditions and in proportions of constituents, so as to form the solvent-copolymer product. When said first copolymerization is substantially completed, another copolymerization reaction is performed by adding to the solvent-copolymer product of the preceding reaction an aliquot part of said first and second monomers, an aliquot part of the chain transfer agent and an aliquot part of catalyst, each of the successive copolymerization reactions being performed substantially under the conditions and with the proportions of the various constituents previously defined for the first reaction steps.

The successive additions of reactants and the maintenance of a reduced monomer concentration have the advantage of favoring a low polydispersity of the copolymer according to the invention and the low molecular weight range of said copolymer.

A low charge of acrylic acid, acrylamide, chain transfer agent and catalyst can be added to the system in the above-mentioned amounts and weight ratios in the single-stage process, and the multi-stage process can be repeated with the addition of further successive charges until the copolymer composition reaches a high level of active matter. Preferably, the reaction will be repeated 3 to 10 times so as to obtain the desired concentration of final product. For example, a proportion of active matter of 52% has been obtained after 10 successive additions of charge.

The chain transfer agent is preferably thioglycolic acid. It is advantageously used in an amount of from 5 to 30%, preferably 12-15% by weight in proportion to all the monomers.

Radical initiator catalysts are, for example, hydrogen peroxide or an alkali metal persulfate, for example, a sodium, potassium or ammonium persulfate. The above-mentioned persulfates are particularly convenient in the domain of high reaction temperatures. Ammonium persulfate is generally used in an amount of 2-8% by weight, preferably 3-5% by weight in proportion to the total amount of monomers.

Advantageously, the monomers copolymerize at a temperature of from 60° to 120° C., preferably in the range of from 70° to 100° C. They are generally used at the available commercial purity degree in an amount of 4-15%, preferably 6-12% by weight in proportion to the copolymerization medium to which they are added.

The reaction time at each stage is generally short, usually from 10 to 60 min. per reaction.

The copolymer neutralization makes the obtained product less corrosive. It is generally performed at a pH of from 3 to 9, depending on the desired degree of neutralization, with such a neutralizing agent as, for example, sodium and potassium hydroxides ammonium hydroxide, mono-and polyalkanolamines, and at a temperature generally at most equal to 70° C. The neutralization agent may be slowly added so as to control the temperature and the dissolution. A substantial formation of vapor is thus avoided.

The two-step manufacture of the copolymers according to the invention comprises:

1) a copolymerization involving both acrylic acid and acrylamide monomers, and 2) a partial or complete neutralization or salification of the carboxylic sites of the obtained copolymer, without hydrolysis of the acrylamide.

As compared with the prior art recommending the copolymer manufacture by acrylamide hydrolysis, the two-step process of the invention is advantageous since, after the copolymers have been injected, their amide sites remain in part potentially hydrolyzable and their secondary salification by contact with the reservoir cations becomes possible, so that the inhibiting properties of the products according to the invention, prepared according to said operating mode and injected for example into the producing well, remain substantially undamaged over periods which may reach several weeks. The surface equipment through which the so-treated fluids will have to flow may thus be protected over distances of several kilometers by this persistent effect of the inhibiting properties.

The use of the anionic copolymer comprising at least partly salified acrylic acid will be described hereinafter. The process of the invention has the purpose of at least partly preventing the deposition, on the walls of oil or geothermal or industrial equipment, of salts from an aqueous medium, containing in particular alkali and/or alkaline-earth metals, flowing through said equipment. According to this process, an anionic copolymer containing (a) acrylic acid, at least partly as alkaline salts and (b) acrylamide, in a proportion from 95:5 to 25:75, advantageously from 90:10 to 50:50, is added to said aqueous medium. Furthermore the molecular weight distribution of said copolymer, determined by exclusion analytic chromatography, is such that at least 60% of the weight molecular weights are lower than 500.

This process offers the advantage of inhibiting the incrustation in the walls of the deposits already present or formed from aqueous media in the conditions prevailing at the surface as well as in those of very deep reservoirs, e.g. at 30°-250° C. under 1 to 500 bars and with a water salt content up to about 350 g/l.

BRIEF DESCRIPTION OF THE DRAWINGS

Preferred embodiments of the invention are illustrated by FIGS. 1 to 4 of the accompanying drawings, diagrammatically showing exclusion chromatograms.

Exclusion chromatography (or gel permeation) is one of the most efficient methods for analyzing the molecular weight distributions of the copolymers according to the invention. As a matter of fact this technique relies on the difference in size of the molecules of polymers or copolymers in solution, which size depends on the molecular weight and on the type of solvent. Accordingly, the copolymer solution is circulated through three TOYO SODA columns of 60 cm length of 7 mm inner diameter filled with a microparticle gel having a TSK PW porosity of 1,000 Å, 3,000 Å and 5 000 Å.(1 Å = $10^{10}$m).

Figure 1:
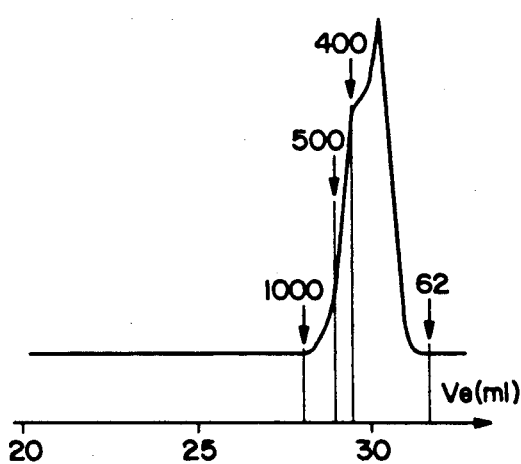

The eluant is formed of 0.5 M NaCl in water and the analysis is performed at 1.0 ml/mn. The molecules of larger size, hence of higher molecular weight, cannot penetrate the pores and are thus excluded, i.e. eluted at first, whereas the smaller molecules which penetrate the pores of the particles are retained and are finally the last to be eluted. Then, with reference to known molecular weights, the obtained chromatogram can be calibrated.

On these figures the elution volume Ve (ml) (corresponding to a scale of molecular weights) is plotted as the abscissa and the relative amount of said molecular weights plotted as the ordinate, for different acrylamide-sodium acrylate balances or constitutions. For example, elution volumes of 28 ml, 29 ml, 29.5 ml and 31.5 ml correspond to respective molecular weights of 1 000, 500 and 400 for polyoxyethylene and 62 for ethylene glycol, eluted with water. Table I hereinafter gives the essential characteristics of the obtained chromatograms.

The weight molecular weight $\overline{M}_w$ and the number molecular weight $\overline{M}_n$ are defined as follows:

$$M_w = \frac{\Sigma c_i M_i^2}{\Sigma c_i M_i}$$

$$M_n = \frac{\Sigma c_i M_i}{\Sigma c_i}$$

wherein $c_i$ is the concentration of the molecular weight constituent $M_i$
and the polydispersity is: $I_w = \frac{M_w}{M_n}$ The percentage of copolymers having a particular molecular weight range, e.g. lower than 500, is determined by integration in a known-per-se manner, of the exclusion chromatograms.

TABLE I

| FIGS. | Acryl-amide (%) | Sodium acry-late (%) | $\overline{M}_w$ | $\overline{M}_n$ | $I_w$ | $\overline{M}_w <$ 500 (%) | 500 < $\overline{M}_w <$ 1000 (%) | $\overline{M}_w >$ 1000 (%) |
|---|---|---|---|---|---|---|---|---|
| 1 | 12 | 88 | 372 | 282 | 1.3 | 80 | 20 | ≈0 |
| 2 | 25 | 75 | 386 | 297 | 1.3 | 85 | 15 | ≈0 |
| 3 | 40 | 60 | 405 | 238 | 1.7 | 72 | 20 | 8 |
| 4 | 50 | 50 | 448 | 223 | 2.0 | 62 | 24 | 14 |

The inhibitor may be introduced in dry state into one of the waters of the aqueous system, preferably into the soft or salted injection water, optionally formed of a water mixture. It may also be introduced into a commercial solution comprising for example 50-60% of active matter. For sake of convenience, the inhibitor may also be introduced from more diluted solutions whose concentration may be, for example, as low as 20 grams per liter. These solutions may be prepared in advance, which constitutes a substantial advantage in exploitation for generalized injections since the solutions may be stored and their ageing (from a few minutes to about ten days) does not change the inhibiting activity of the copolymer (and is sometimes advisable).

1 to 200 ppm (parts per million) of active matter according to the invention can be introduced into the aqueous medium. Excellent results are obtained, particularly for the activity of crystalline growth inhibition (above-defined) substantially equal to 100%, under very severe thermodynamic conditions of the field, with a 15-50 ppm concentration of active matter.

It must be observed that, for a given water mixture, the inhibition efficiency also depends on the copolymer constitution, i.e. on the acrylate/acrylamide ratio by weight.

Before using the copolymer according to the invention as inhibitor on industrial scale in the equipments, it is advisable to conduct laboratory inhibition tests, advantageously for 4-6 hours under a pressure from 10 to 400 bars at a temperature from 20° to 200° C. so as to substantially simulate the thermodynamic conditions of the field or of the relevant equipment.

In this connection, an inhibition activity A is defined by gravimetry as:

$$A = \frac{m_1 - m_2}{m_1} \times 100$$

wherein $m_1$ and $m_2$ are the weights of deposits obtained by admixing the waters respectively in the absence and in the presence of inhibitor, these deposits being recovered under the same conditions.

The previously recovered field and injection waters may be admixed in any proportion but preferably in a ratio corresponding to the so-called critical mixture, as defined below. For this purpose, they are brought to thermodynamic conditions similar to those prevailing in deep oil reservoirs for each water mixture ratio. In these severe conditions, the water incompatibility may result particularly in the formation of deposits of alkaline-earth sulfate, mainly barium or calcium sulfate, carbonates, sulfides and phosphates of the alkali or alkaline-earth type. The precipitated salts are recovered by filtration under differential pressure, dried and weighed. The results are plotted as a substantially parabolic gravimetry curve of water incompatibility from which can be determined, around its maximum, the critical water mixture corresponding to maximum deposits.

After the water critical mixture has been prepared, the inhibitor according to the invention is introduced in the above-mentioned thermodynamic conditions. A curve of the activity versus the inhibitor concentration, giving the range of optimum inhibitor concentration required to obtain an inhibition activity of substantially 100%, may thus be determined. For the industrial application on the field it just suffices to introduce the inhibitor at said optimum concentration.

The process according to the invention copes with the difficulties resulting from the incompatibility of various water mixtures within a ionic strength range from 0.05 to 6.5 and a pH range from 8.5 to 5.0, these limits being not compulsory.

The inhibitor according to the invention may also be dissolved into additives commonly used in oil production, for example demulsifying agents, anticorrosive agents, bactericide agents, antifoam agents, etc...

EXAMPLES

The following examples are given for illustrative purposes and must not be considered as limiting the scope of the invention.

They concern the application to a mixture of two waters but the process may also be applied to a more complex mixture for which it will suffice to determine the incompatibility gravimetry curve and accordingly the value of the mixture favoring the maximum deposits.

In these examples the reactant amounts are expressed as parts by weight.

Example 1

A stirred reactor, equipped with a reflux condenser, a thermometer and an addition funnel, is charged with 2700 parts of deionized water and 3 parts of DTPA Masquol (sodium salt of diethylene triamine pentacetic acid). The reactor is heated to about 75° C. and, at said temperature, fed with 306 parts of acrylic acid, 102 parts of acrylamide and 49 parts of thioglycolic acid (acting as a chain transfer agent). After dissolution and homogenization, a solution of 12.6 parts of ammonium persulfate in 114 parts of deionized water is introduced into the reactor. An exothermic reaction takes place. The temperature increases from 75° to 95° C. The exothermicity is controlled so as to prevent the temperature to increase above 95° C. The reaction is rapid and lasts 15–20 minutes. After the exothermic reaction has been completed, the mixture is cooled to 90° C. and a solution of 4 parts of ammonium persulfate in 30 parts of deionized water is again charged into the reactor. The reaction is continued for 30 minutes and the reaction mixture is cooled to 75° C.

This procedure is repeated 9 times successively by introducing at each time into the reaction mixture 306 parts of acrylic acid, 102 parts of acrylamide, 49 parts of thioglycolic acid, then a solution of 12.6 parts of ammonium persulfate in 114 parts of deionized water and, after completion of the exothermic reaction, a solution of 4 parts of ammonium persulfate into 30 parts of deionized water.

For the last addition, the temperature is maintained for 2 additional hours at 90° C. after a solution of 9 parts of ammonium persulfate in 70 parts of deionized water has been added for reducing to a maximum extent the residual free monomers.

The mixture is then cooled to 60° C. and 1000 parts of flaky soda are slowly added thereto so as to neutralize it to a pH from 5.5 to 6.

The mixture is cooled to 20° C., and, by mere dilution, the [, product is adjusted to standards of active matter, pH and viscosity.

Figure 2:
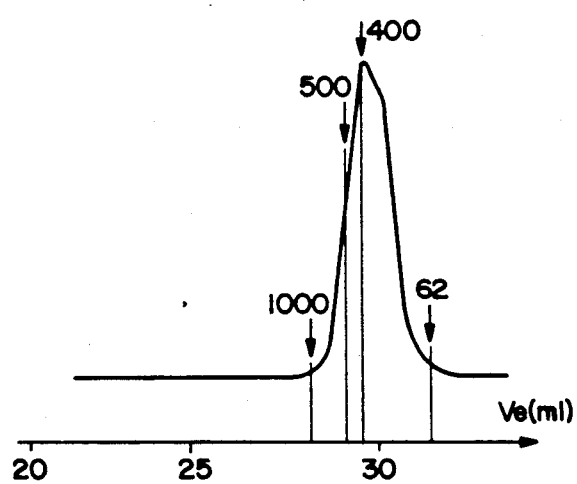
Figure 3:
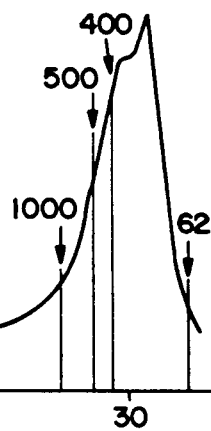

The obtained aqueous solution of 25:75 by weight copolymer of acrylamide and sodium acrylate at 52% concentration has a pH of about 5.5–6 and a viscosity of about 0.3 to 0.5 Pa.s at 20° C. with the molecular weight distribution shown in FIG. 2.

Example 2

Figure 4:
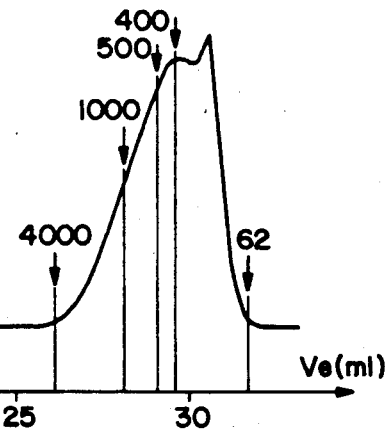

Example 1 is repeated in the same conditions except that the monomers consist of 204 parts of acrylic acid of 204 parts of acrylamide. A 50–50 acrylate-acrylamide copolymer is obtained which is defined by the exclusion chromatogram of FIG. 4.

Example 3

In a steel reactor, two waters, consisting of an injection water A of sea-water type, whose composition and characteristics are reported in table II, and of a field water B of cambrian type whose composition and characteristics are reported in table III, are admixed in a proportion of 30% A water - 70% B water, corresponding to the critical mixture favoring the maximum incompatibility.

The admixture is conducted at 120° C. under 200 bars and with a reaction time of 4 hours in the presence of the gaseous and liquid hydrocarbons of the field.

After opening of the reactor, the deposits are recovered by filtration under differential pressure, dried and weighed, the obtained deposit amount $m_1$ being necessary to calculate the inhibition activity.

The same operation is repeated after introduction of the inhibitor according to the invention (from a commercial solution containing 55% of active matter) into water A, the deposit amount $m_2$ obtained at the end of the operation, being necessary to calculate the activity.

It has been then discovered that a 100% inhibition activity was obtained with salified acrylamide-acrylic copolymers, in the form of sodium acrylate according to the invention, whose constitution and concentration conditions are reported in table IV.

TABLE II

| INJECTION WATER A | |
|---|---|
| CONSTITUENTS | CONCENTRATION mg/l |
| $Na^+$ | 11,500 |
| $K^+$ | 410 |
| $Mg^{++}$ | 1440 |

TABLE II-continued

INJECTION WATER A

| CONSTITUENTS | CONCENTRATION mg/l |
| --- | --- |
| $Ca^{++}$ | 450 |
| $Sr^{++}$ | 9 |
| Total cations | 13,809 |
| $Cl^-$ | 20,200 |
| $HCO^-$ | 166 |
| $SO_4^{--}$ | 2225 |
| Total anions | 22,591 |
| Ionic strength J | 0.74 |
| $pH_{20°\ C.}$ | 8.17 |
| $d_{25°\ C.}$ | 1.0236 |
| Calculated salt content | 36,400 |

TABLE III

FIELD WATER B

| CONSTITUENTS | CONCENTRATION (mg/l) |
| --- | --- |
| $Na^+$ | 71,094 |
| $K^+$ | 5169 |
| $NH_4^+$ | 2529 |
| $Li^+$ | 82 |
| $Ca^{++}$ | 27,269 |
| $Mg^{++}$ | 8369 |
| $Sr^{++}$ | 1215 |
| $Ba^{++}$ | 562 |
| $Mn^{++}$ | 55 |
| $B^{+++}$ | 28 |
| Total cations | 116,972 |
| $Cl^-$ | 194,010 |
| $Br^-$ | 776 |
| Total anions | 194,786 |
| Ionic strength J | 6.45 |
| $pH_{20°\ C.}$ | 6.85 |
| $d_{20°\ C.}$ | 1.2077 |
| Calculated salt content | 311,758 mg/l |

TABLE IV

| M < 500 | Acrylamide-acrylic % by weight in copolymer constitution | | Active matter concentration (ppm by weight) |
| --- | --- | --- | --- |
| 80 | 12 | 88 | 20–30 |
| 85 | 25 | 75 | 15–25 |
| 72 | 40 | 60 | 20–30 |
| 62 | 50 | 50 | 30–50 |

Example 4

The required concentrations for 100% activity are compared for copolymers comprising 25% of acrylamide and 75% of sodium acrylate according to the invention and copolymers of higher molecular weight having the same constitution (25% acrylamide - 75% sodium acrylate) introduced, according to example 3, in a injection water C of Albian type admixed with a field water D of Cambrian type in the critical mixture ratio of 40% C - 60% D. The composition of these waters is given in tables VI and VII. The results of example 4 are reported in table V.

TABLE V

| Molecular weights | Active matter concentration (ppm) |
| --- | --- |
| <500 (85%) | 15–25 |
| 500–1000 | 80–100 |
| 1000–2000 | 150–200 |
| 5000–10,000 | >200 |

TABLE VI

INJECTION WATER C

| CONSTITUENTS | CONCENTRATION mg/l |
| --- | --- |
| $Na^+$ | 260 |
| $K^+$ | 45 |
| $Mg^{++}$ | 65 |
| $Ca^{++}$ | 185 |
| $Sr^{++}$ | 3 |
| $Fe^{++}$ | 9 |
| Total cations | 567 |
| $Cl^-$ | 533 |
| $HCO_3^-$ | 285 |
| $SO_4^{--}$ | 380 |
| Total anions | 1198 |
| Ionic strength J | 0.045 |
| $pH_{20°\ C.}$ | 8.06 |
| $d_{20°\ C.}$ | 1.042 |
| Calculated salt content | 1765 mg/l |

TABLE VII

FIELD WATER D

| CONSTITUENTS | CONCENTRATION mg/l |
| --- | --- |
| $Na^+$ | 77,000 |
| $K^+$ | 8000 |
| $Li^+$ | 110 |
| $NH_4^+$ | 41 |
| $Ca^{++}$ | 31,500 |
| $Mg^{++}$ | 8700 |
| $Sr^{++}$ | 1025 |
| $Ba^{++}$ | 480 |
| $Mn^{++}$ | 639 |
| $Zn^{++}$ | 110 |
| $Fe^{++}$ | 1000 |
| $Pb^{++}$ | 6 |
| $B^{+++}$ | 15 |
| Total cations | 128,626 |
| $Cl^-$ | 204,800 |
| $Br^-$ | 468 |
| $I^-$ | 38 |
| Total anions | 205,306 |
| Ionic strength J | 6.9 |
| $pH_{20°\ C.}$ | 5.30 |
| $d_{25°\ C.}$ | 1.220 |
| Calculated salt content | 333,932 mg/l |

Example 5

As in example 1, copolymers of different salt contents are prepared (acrylamide-ammonium acrylate copolymer or acrylamide-potassium acrylate copolymer). A 100% inhibition activity is obtained with substantially the same inhibitor concentrations as in example 3, for identical copolymer constitutions.

Example 6

The inhibitor (25% acrylamide - 75% sodium acrylate copolymer) is introduced into sea-water as in example 3 from a solution containing 10g of active matter per liter of injection water and after ageing for 10 days.

The 100% inhibition activity is obtained with an inhibitor concentration substantially identical to that of example 3.

Example 7

An inhibitor according to example 6 or of higher molecular weight for comparison purposes, is introduced into the water mixture of example 3 at a concentration of 50 ppm. Table VIII shows that the copolymer according to the invention has a long-lasting inhibiting activity, appraised from the persistent limpidity of the treated water mixture, as compared with the prior art.

TABLE VIII

| MOLECULAR WEIGHTS | PERSISTENCY OF 100% ACTIVITY |
| --- | --- |
| <500 (85%) | Several months |
| 500–2000 | 40 hours |
| 5000–10,000 | 30 hours |

What is claimed as the invention is:

1. An anionic copolymer comprising recurrent units deriving from acrylic acid and acrylamide in a ratio by weight from about 95:5 to 25:75, wherein the molecular weight distribution of said copolymer, determined by exclusion analytic chromatography, is such that at least 60% of the molecular weights are lower than 500.

2. An anionic copolymer according to claim 1, wherein the acrylic acid is at least partly present as an acrylate of at least one alkali metal.

3. A copolymer according to claim 1, having a polydispersity of at most 3.

4. A copolymer according to claim 1, produced by a process comprising reacting the four following constituents:
   a) a first monomer essentially consisting of acrylic acid,
   b) a second monomer essentially consisting of acrylamide,
   c) a chain transfer agent, and
   d) a free radical initiator catalyst, in a medium comprising an inert solvent at a temperature from 60° to 120° C., the total amount of said monomers in proportion to said medium being from 4 to 15%, the amount of said chain transfer agent in proportion by weight to said monomers from 5 to 30% and the amount of catalyst in proportion by weight to said monomers from 2 to 8%, the first and second monomers being in a respective ratio by weigh from 95:5 to 27:75, so as to obtain a product comprising the desired copolymer in admixture with the solvent.

5. A copolymer according to claim 4, characterized in that the copolymerization reaction is completed by reacting said solvent-copolymer product with an additional catalyst amount of 0.5 to 4% by weight in proportion to said monomers.

6. A copolymer according to claim 4, characterized in that the amount of constituents to be involved in the reaction is subdivided into substantially equal aliquot parts, a first copolymerization reaction is performed in the conditions and with the proportions of the various constituents defined in claim 4 or 5, so as to form said solvent-copolymer product, and, after substantial completion of the preceding copolymerization reaction, at least one other consecutive copolymerization reaction is performed by adding to the solvent-copolymer product of the preceding reaction an aliquot part of said first and second monomers, an aliquot part of the chain transfer agent and an aliquot part of catalyst, each of the successive copolymerization reactions being performed substantially in the conditions and with the proportions between the various constituents defined in claim 4 or 5.

7. A copolymer according to claim 4, wherein the process comprises using thioglycolic acid as chain transfer agent.

8. A copolymer according to claim 4, wherein the process comprises using ammonium persulfate as catalyst.

9. A copolymer according to claim 6, wherein the process comprises using 3 to 10 successive copolymerization reactions.

10. A copolymer according to claim 4, wherein the step of neutralization at a pH from 3 to 9 is performed with a neutralization agent selected from potassium, sodium and ammonium hydroxides, alkylamines, mono- and polyalkanolamines.

11. A copolymer produced from the process of claim 4.

12. A copolymer produced from the process of claim 5.

13. A copolymer produced from the process of claim 6.

14. A copolymer produced from the process of claim 7.

15. A copolymer produced from the process of claim 8.

16. A copolymer produced from the process of claim 9.

17. A copolymer produced from the process of claim 10.

18. A copolymer according to claim 1, in aqueous solution.

19. A copolymer according to claim 1, wherein at least 85% of the molecular weights are lower than 500.

* * * * *